July 18, 1933.    A. G. LUTTRELL    1,918,651
WINDSHIELD HEATER AND WIPER
Filed Feb. 3, 1933
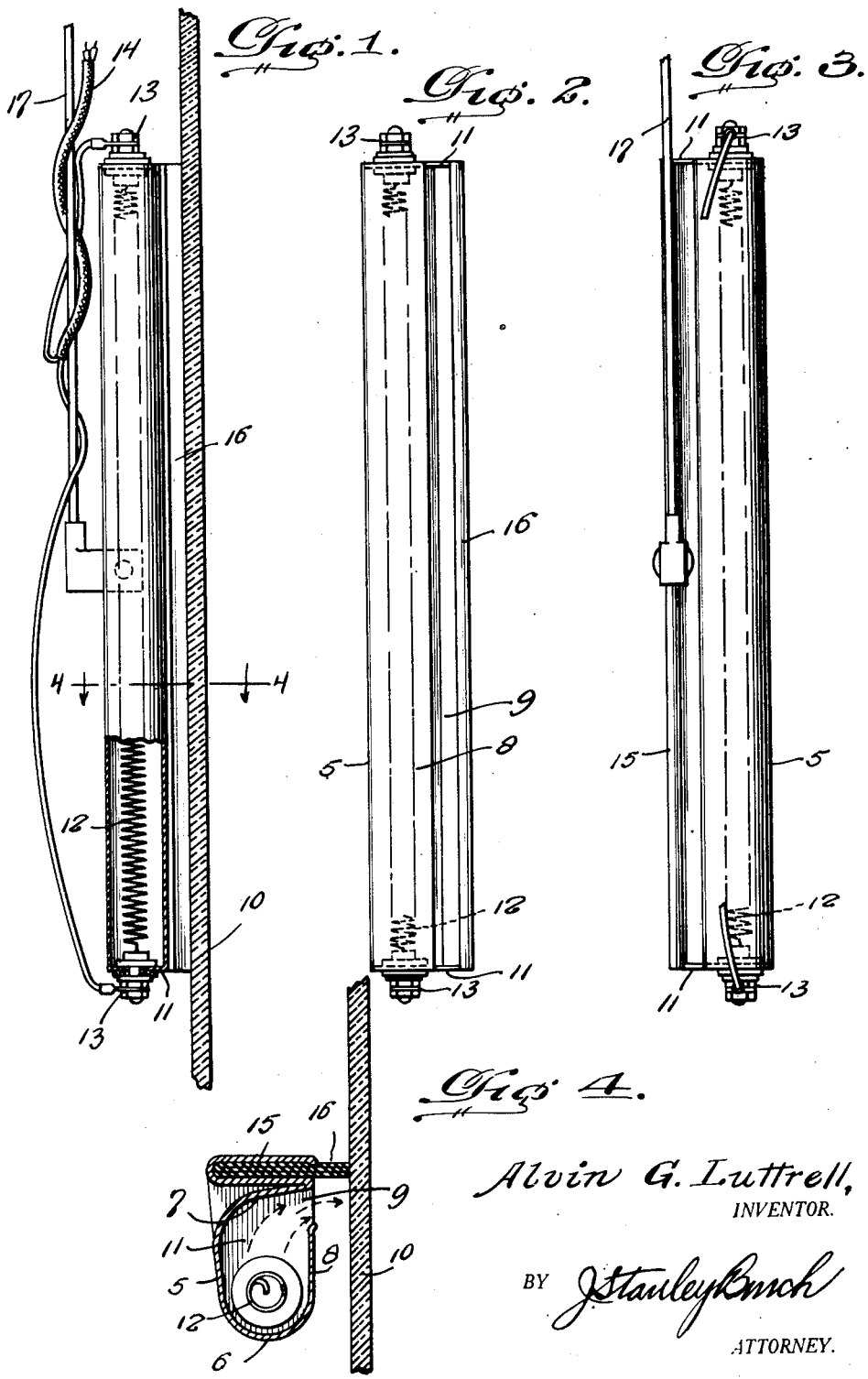
Alvin G. Luttrell,
INVENTOR.
BY J. Stanley Birch
ATTORNEY.

Patented July 18, 1933

1,918,651

UNITED STATES PATENT OFFICE

ALVIN G. LUTTRELL, OF DALLAS, TEXAS

WINDSHIELD HEATER AND WIPER

Application filed February 3, 1933. Serial No. 655,108.

This invention relates to a combined windshield heater and wiper, and has more particular reference to the provision of a heating element on one side of a windshield wiper blade, to prevent the freezing of snow, rain and the like on the windshield during cold weather so that the wiper blade may effectively clean the windshield and insure clear vision.

An object of the invention is to provide a combined windshield heater and wiper construction which is extremely simple and compact, inexpensive to manufacture, and efficient and reliable in use.

Other objects will become apparent as the nature of the invention is better understood, and the same consists in the novel form, combination and arrangement of parts hereinafter more fully described, shown in the accompanying drawing and claimed.

In the drawing:

Figure 1 is a side elevational view of a combined windshield heater and wiper embodying the present invention as it appears in use, partly broken away and in section.

Figure 2 is a rear elevational view of the construction shown in Figure 1, with parts omitted.

Figure 3 is a front elevation looking toward the right of Figure 1; and

Figure 4 is a horizontal section on line 4—4 of Figure 1.

Referring more in detail to the drawing, the present invention includes an electrical heater having an elongated hollow casing formed of sheet metal and composed of a front wall 5, side walls 6 and 7, a rear wall 8 integral with the side wall 6 and narrower than the front wall 5 so as to provide a rear opening 9 near the side wall 7 and facing the windshield 10 so as to cause the heat to be deflected onto the windshield directly adjacent the wiper blade in a manner which will presently become apparent, and walls 11 closing the ends of the casing. The heater further embodies an elongated heating element 12, preferably in the form of a straight helical resistance coil, and attached at its opposite ends to terminals or binding posts 13 suitably secured in and insulated from the ends walls 11 and the casing. Current may be suitably supplied to the resistance element 12 by means of a conductor 14 whose wires are respectively connected to the terminals 13 at opposite ends of the heater casing, and which may be suitably connected to the source of current, such as being provided with a plug for engagement in the dash light socket of the automobile equipped with the present windshield heater and wiper. It will be noted that the resistance element 12 is located between the front wall 5 and rear wall 8 of the heater casing adjacent the side wall 6 and to one side of the opening 9 so that it will not shine in the eyes at night time.

The side wall 7 of the heater casing adjacent the opening 9 is provided with an integral extension that is bent forwardly and then centrally folded upon itself to form a U-shaped holder 15 in which is secured or clinched a rubber or like wiping element or squeegee 16, the holder 15 and wiping element 16 extending the full length of the heater casing directly at one side of the opening 9, so that the heat is deflected onto the windshield 10 directly adjacent the wiping element 16 as stated above. This insures efficient melting and loosening of snow, sleet and ice that may tend to form on the surface of the windshield, so that the wiper blade may effectively remove the same to insure clear vision. A rod 17 is attached to the holder 15 of the wiper blade and may be connected to any suitable actuating means whereby the heater and wiper is moved back and forth across the surface of the windshield 10, in a well known manner.

From the foregoing description, it will be seen that the present device is extremely simple and compact in construction, inexpensive to manufacture, and efficient in operation. Minor changes are contemplated within the scope of the appended claims.

What I claim as new is:

1. A windshield heater and wiper comprising an electrical heater having an elongated hollow casing composed of end, side, front and rear walls, the rear wall being narrower than the front wall to provide an opening adjacent one side of the casing, said one side of the casing having an integral extension folded forwardly and centrally bent upon itself to provide a U-shaped holder, a wiping element secured in said holder directly adjacent said opening, a resistance element extending longitudinally of the casing adjacent the other side of the latter and to one side of said opening, and means for placing the resistance element in an electric circuit including terminals mounted in and insulated from the end walls of the casing.

2. A windshield heater and wiper comprising an elongated hollow casing having a rear opening adjacent one side, a resistance element extending longitudinally of the casing to one side of said opening, a wiper blade including a holder rigid with a side of said casing adjacent said opening, and means for placing the resistance element in an electric circuit.

ALVIN G. LUTTRELL.